UNITED STATES PATENT OFFICE.

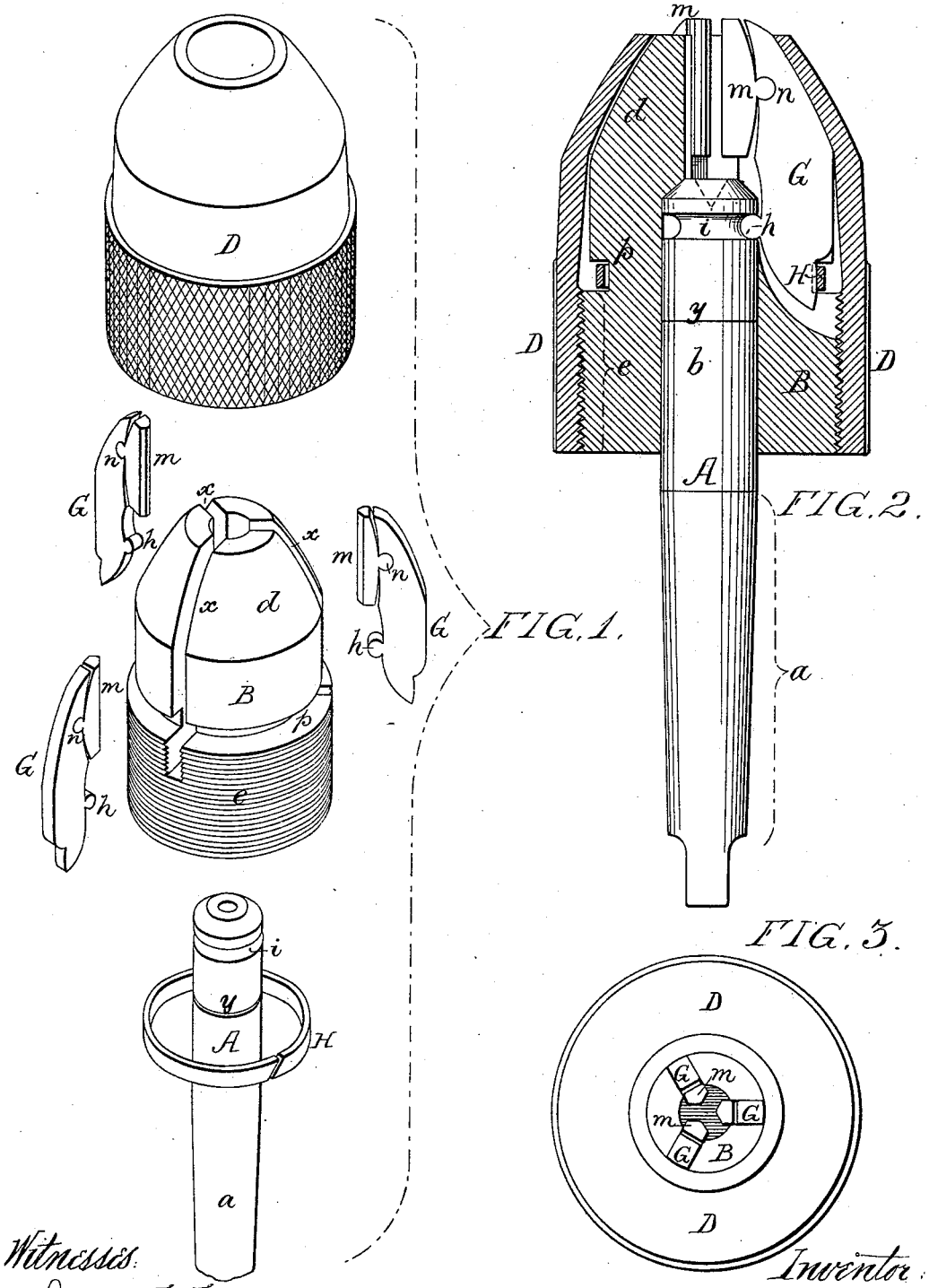

GEORGE S. ROMINGER, OF PHILADELPHIA, PENNSYLVANIA.

DRILL-CHUCK.

SPECIFICATION forming part of Letters Patent No. 243,978, dated July 5, 1881.

Application filed May 3, 1881. (No model.)

*To all whom it may concern:*

Be it known that I, GEORGE S. ROMINGER, a citizen of the United States, residing in Philadelphia, Pennsylvania, have invented an Improvement in Tool-Holding Chucks, of which the following is a specification.

My invention relates to improvements in that class of chucks which are commonly used in connection with lathe-spindles for griping drills and other tools; and the main objects of my invention are to make a cheap chuck of this class, and to insure the firm griping of the drill or other tool. These objects I attain in the manner which I will now proceed to describe, reference being had to the accompanying drawings, in which—

Figure 1 represents in perspective the different parts (detached from each other) of my improved chuck; Fig. 2, a view showing the chuck in section and its mandrel in elevation, and Fig. 3 an end view of the chuck.

A portion, $a$, of the mandrel A is, in the present instance, made tapering so as to fit snugly in the tapering orifice of a lathe-spindle, and to the cylindrical portion $b$ of the said mandrel is secured the block B, which forms the body of the chuck, and which is made tapering at its outer portion, $d$. The cylindrical portion $e$ of the block is threaded externally and adapted to the internally-threaded sleeve D, the outer portion of which is made tapering. Radial slots $x$ (three in the present instance) are formed in the block for receiving the levers G, on each of which is formed a projecting pivot, $h$, adapted to an annular groove, $i$, in the mandrel. Each lever is provided with a self-accommodating jaw, $m$, which is pivoted to the said lever, preferably by making on the jaw a projection, $n$, adapted to a recess in the long arm of the lever, the outer edge of this arm being made on a taper conforming, or nearly so, with that of the sleeve. An annular groove, $p$, is formed in the block B for the reception of a split ring, H, which, bearing against the short arms of the levers G tends to force the same inward, and consequently to open the jaws, which can only be closed by screwing down the sleeve on the block, in doing which the tapering portion of the said sleeve must act on all the levers simultaneously, thereby causing the jaws to simultaneously gripe the butt of the drill, or any other tool which has to be held by the chuck, the tool being very securely held, as the jaws accommodate themselves to it and have a bearing on it throughout their entire length.

The sleeve D should be roughened or milled so that it can be easily tightened by the hand, or in chucks of a larger size the sleeve may have orifices, or may be otherwise constructed for being tightened by any available instrument.

The advantage of the improved chuck, in addition to that presented by the self-accommodating jaws, is its simplicity as regards construction, none of the parts requiring any elaborate or accurate finishing.

The outer edges of the long arms of the levers G on which the sleeve D acts are curved, and the inner face of the tapered portion of the sleeve is correspondingly curved, so as to insure an extended bearing of the sleeve on the levers as the latter change their position, and for the same reason the outer edges of the jaws $m$ and the faces of the levers G adjacent thereto are also curved.

While the levers and block might be so constructed that the former could be pivoted directly to the latter, it is much more economical to extend the mandrel into the block, and to adapt projections on the levers to a groove in the said mandrel as described and illustrated.

The spring and short arms of the levers may be dispensed with, but they are in all cases to be preferred, so as to insure the self-opening of the jaws.

In some cases a short plug terminating at the line $y$, Figs. 1 and 2, may be used in place of the long mandrel, the chuck in this case being adapted to a projecting mandrel on the lathe-spindle instead of to a recess in the latter.

I claim as my invention—

1. The combination, in a chuck, of the slotted block B and its sleeve D, with the pivoted levers G, having pivoted jaws $m$, substantially as described.

2. The combination of the slotted block B, the mandrel or plug A, and the sleeve D, with the levers G, pivoted to the mandrel or plug, substantially as set forth.

3. The combination of the sleeve D and the slotted block B, having a groove, $p$, with the pivoted levers G and split-ring H, as specified.

4. The combination of the levers G, having curved inner edges and recesses, as described, with the jaws $m$, having curved rear edges and lugs $n$, adapted to the recesses of the levers, as set forth.

5. The combination of the lever G, having a projecting pivot-lug, $h$, with the jaw $m$, having a projecting lug, $n$, adapted to a recess in the lever, as set forth.

In testimony whereof I have signed my name to this specification in the presence of two subscribing witnesses.

GEO. S. ROMINGER.

Witnesses:
ARMER F. McCORMICK,
HARRY SMITH.